Dec. 3, 1929.  F. P. REIDHAAR  1,737,730
FASTENING DEVICE
Filed July 6, 1928
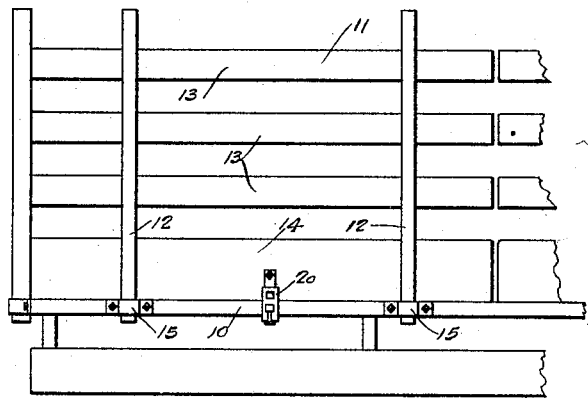
Fig.1.
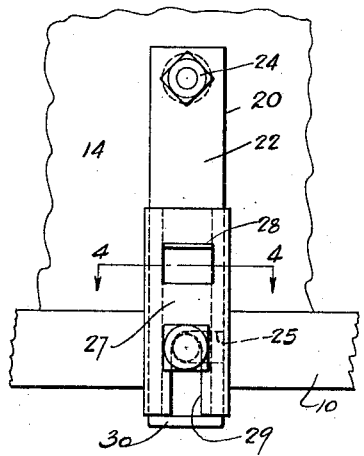
Fig.2.
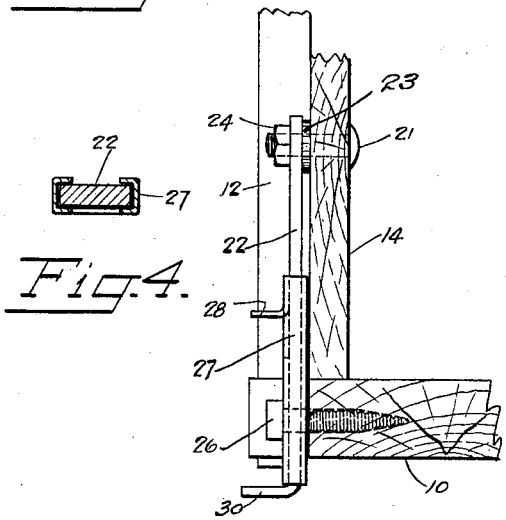
Fig.4.
Fig.3.
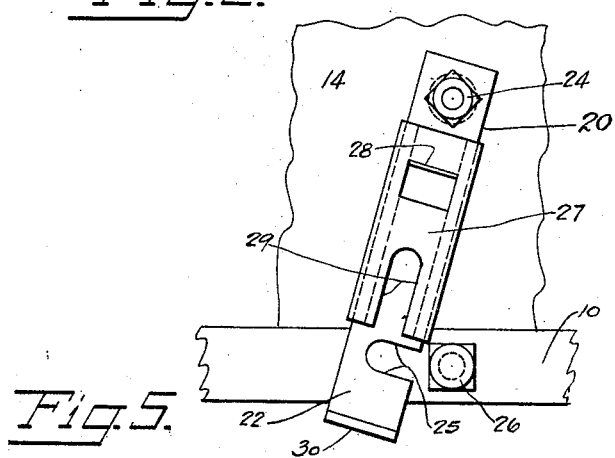
Fig.5.
INVENTOR.
Frank Paul Reidhaar
BY
Wm T. Hedlund
his ATTORNEY.

Patented Dec. 3, 1929

1,737,730

UNITED STATES PATENT OFFICE

FRANK PAUL REIDHAAR, OF EVANSVILLE, INDIANA, ASSIGNOR TO HERCULES PRODUCTS, INC., OF EVANSVILLE, INDIANA, A CORPORATION OF DELAWARE

FASTENING DEVICE

Application filed July 6, 1928. Serial No. 290,793.

My invention relates to latches for use in connection with automobile bodies and the like. The object of the invention is to provide a fastening or locking device or latch particularly adapted to hold a side section of an open truck body down on the platform section. In automobile truck bodies using stake sections, there is a tendency for the stake sections to jump out of the stake pockets. My invention provides means for preventing this tendency while providing ready detachability of the stake section from the platform.

My invention will be described with reference to the accompanying drawing showing a preferred form of my improved fastening device, wherein:

Fig. 1 shows a section of a truck body comprising a stake section held in place on the platform by means of a fastening device embodying the invention;

Fig. 2 is an enlarged front view of the fastening device;

Fig. 3 is a side view of the fastening device;

Fig. 4 is a sectional view taken on line 4—4 of Fig. 2; and

Fig. 5 shows the fastening device unlatched.

Referring more particularly to Fig. 1, reference character 10 designates the platform or floor of an automobile business body. On the side of the body is a stake section 11 comprising stakes 12, cross-members 13 and a wider base board 14. The stakes set into stake pockets 15.

My novel fastening device is designated generally by reference character 20. It is pivotally secured to a pivot bolt 21 passing through the lowest cross-member or base board of the stake section.

The fastening device comprises a vertical plate 22 having a hole in its upper end through which bolt 21 passes. A washer 23 is interposed between plate 22 and the base board. A nut 24 is passed over the end of the bolt to maintain the vertical plate pivoted on bolt 21. If desired, a cotter pin or lock nut may be added to keep the nut in position.

At the lower end of plate 22 is a transverse slot 25 extending in from the side thereof having a semi-circular inner end. This slot receives the shank of a screw 26 when plate 22 is in place in true vertical position. In Fig. 5 it will be seen that if plate 22 is rotated anti-clockwise, to vertical position, slot 25 will engage the shank of screw 26, the head of screw 26 being arranged out beyond plate 22 as shown in Fig. 3. Screw 26 is screwed into the platform so that when the shank of screw 26 is in slot 25, an upward pull of the stake section away from the platform would result in the shank of screw 26 bearing against the lower side of the slot. Obviously this would hold the parts together.

To hold screw 26 in the slot, or the slot around screw 26, I provide a sliding member 27, slidable over plate 22. The sides of member 27 are bent around the sides of plate 22 as shown in Fig. 4. Figs. 2 and 3 show slidable member 27 in lowered or locked position and Fig. 5 shows it in raised position. A projection 28 serves to permit raising of member 27 by hand.

Member 27 has a longitudinal slot 29 extending upwardly from the bottom edge and having an upper semi-circular end. When plate 22 is in vertical position with the shank of screw 26 way in in slot 25 member 27 can slide down so that its parts forming slot 29 slide past the shank of screw 26 and the shank of screw 26 is in slot 29. In such position member 22 cannot be moved and the fastening device is in locked position. This position is shown in Figs. 2 and 3. The manner of unfastening the device is readily apparent from Fig. 5. Slide member 27 is first lifted and then the bottom part of plate 22 is swung to the left, as shown in Fig. 5.

It will be noted that the semi-circular parts of the slots are at right angles to each other and in part coincide and that they permit a plurality of members to slip over the shank of screw 26 from the different directions. Plate member 22 is formed at the bottom to provide a stop 30 for limiting downward movement of slide 27.

While I have shown a preferred form of my invention, it will be evident that variations may be made within the spirit and scope of the invention. For example, the members need not be flat and the transverse slot may be cut from the opposite side.

Having thus described my invention what I claim is:

1. A fastening device comprising a pivoted plate, a slidable plate mounted thereon, a bolt at right angles to both of said plates having an enlarged outer end, a transverse slot in said pivoted plate extending in from the side thereof having a semi-circular inner end, said slot embracing said bolt, a vertical slot in said slidable plate extending from one end thereof having a semi-circular inner end and overlapping a portion of the transverse slot and embracing said bolt between the pivoted plate and the enlarged outer end and the semi-circular ends of said slots coinciding in part.

2. A fastening device comprising a pivoted plate, a slidable plate mounted thereon, a bolt at right angles to both of said plates having an enlarged outer end, a transverse slot in said pivoted plate extending in from the side thereof having a semi-circular inner end, said slot embracing said bolt, a vertical slot in said slidable plate extending from one end thereof having a semi-circular inner end and overlapping a portion of the transverse slot and embracing said bolt, said slidable plate preventing movement of said pivoted plate in transverse and lateral directions and the semi-circular ends of said slots coinciding in part.

In testimony whereof I have affixed my signature.

FRANK PAUL REIDHAAR.